US 6,731,574 B1

(12) United States Patent
Abe et al.

(10) Patent No.: US 6,731,574 B1
(45) Date of Patent: May 4, 2004

(54) FOCUS SERVO CONTROLLING APPARATUS, INFORMATION REPRODUCING APPARATUS AND INFORMATION RECORDING APPARATUS

(75) Inventors: Shinichiro Abe, Kawagoe (JP); Takayuki Iijima, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 376 days.

(21) Appl. No.: 09/684,798

(22) Filed: Oct. 10, 2000

(30) Foreign Application Priority Data

Oct. 8, 1999 (JP) ............................ P11-288051

(51) Int. Cl.$^7$ ................................. G11B 7/00
(52) U.S. Cl. ................ 369/44.32; 369/44.35; 369/53.28; 369/44.11
(58) Field of Search ................ 369/43, 43.11, 369/43.13, 43.14, 44.11, 44.25, 44.27, 44.29, 44.35, 44.41, 53.23, 53.28

(56) References Cited

U.S. PATENT DOCUMENTS

| | | | | |
|---|---|---|---|---|
| 4,701,603 A | * | 10/1987 | Dakin et al. .............. | 369/44.29 |
| 5,610,886 A | * | 3/1997 | Hayashi et al. ........... | 369/44.29 |
| 5,629,912 A | * | 5/1997 | Okawa et al. ............ | 369/44.29 |
| 5,894,463 A | * | 4/1999 | Okawa et al. ............ | 369/44.29 |
| 5,903,530 A | * | 5/1999 | Tateishi et al. ........... | 369/44.25 |
| 5,978,331 A | * | 11/1999 | Ceshkovsky .............. | 369/44.29 |
| 6,151,280 A | * | 11/2000 | Naohara et al. .......... | 369/44.27 |
| 6,256,273 B1 | * | 7/2001 | Matsuda et al. .......... | 369/44.27 |

FOREIGN PATENT DOCUMENTS

| | | |
|---|---|---|
| EP | 0 420 475 A2 | 4/1991 |
| JP | 6-4878 | 1/1994 |
| JP | 6-68518 | 8/1994 |
| JP | 10-134376 | 5/1998 |

* cited by examiner

*Primary Examiner*—Doris H. To
*Assistant Examiner*—Jorge L Ortiz-Criado
(74) *Attorney, Agent, or Firm*—Sughrue Mion, PLLC

(57) ABSTRACT

A focus servo control is performed by changing a condition of a focus servo loop from an open condition to a close condition in correspondence with a level of a reflection light signal, which is obtained as a reflection light of a light beam reflected from an information record medium is detected by a light receiving element such as an optical pickup. A focus servo controlling apparatus is provided with a disturbance level detecting device such as a servo control circuit for detecting a level of a disturbance light signal, which is obtained as a disturbance light other than the reflection light is received by the light receiving element; and a controlling device such as a system controller for setting a level, which is larger than the level of the disturbance light signal detected by the disturbance level detecting device, as a threshold level and for changing the condition of the focus servo loop from the open condition to the close condition on the basis of a timing when the level of the reflection light signal becomes equal to or larger than the set threshold level.

23 Claims, 6 Drawing Sheets

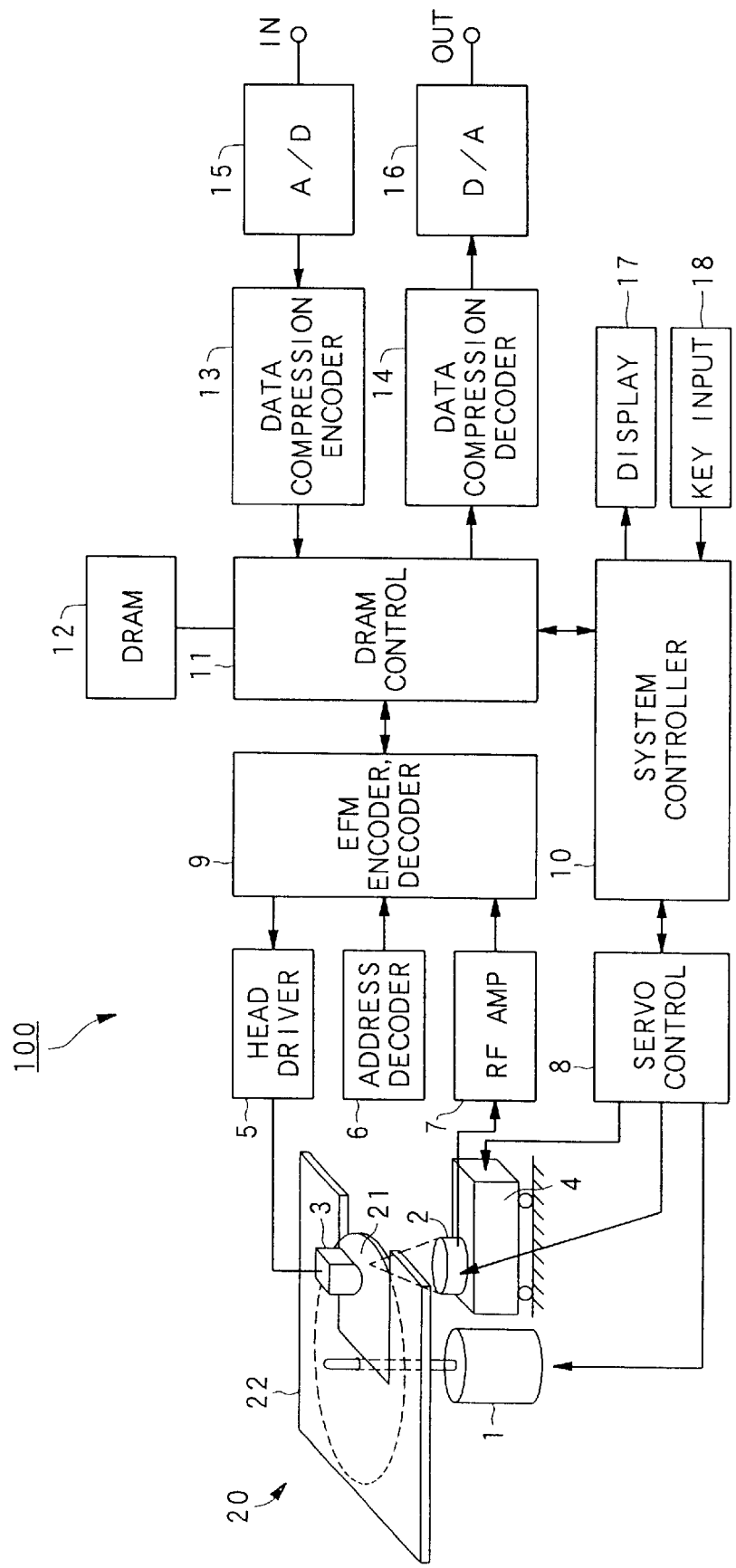

FOCUS SERVO CONTROLLING APPARATUS, INFORMATION REPRODUCING APPARATUS AND INFORMATION RECORDING APPARATUS

BACKGROUND OF THE INVENTION

1. Field of the Invention

The present invention generally relates to a focus servo controlling apparatus, an information reproducing apparatus and an information recording apparatus including such a focus servo controlling apparatus. More particularly, the present invention relates to a focus servo controlling apparatus for controlling a focal point of a light beam when optically recording or reproducing information with respect to an information record surface of an information record medium, and an information reproducing apparatus and an information recording apparatus including such a focus servo controlling apparatus.

2. Description of the Related Art

When optically recording or reproducing information with respect to an information record medium such as an optical disc, it is necessary to make a focal point of a light beam, such as a laser light for recording or reproducing the information, accurately coincident with a position on an information track of an information record surface of the information record medium.

At this time, as a positional control of the focal point, there are a positional control in a direction perpendicular to the information record surface and a positional control in a direction parallel to the information record surface. Among them, the positional control in the direction perpendicular to the information record surface is often performed by a so-called focus servo control.

Here, as a method of performing the focus servo control, there is a so-called astigmatic method or a so-called Foucault method. In either of these methods, a so-called S curve as shown in FIG. 6 is obtained as a focus error signal $S_{FE}$ on the basis of a reflection light of a light beam from an information record medium, and the position of the focal point of the light beam is made coincident with the position of the information record surface by moving an objective lens in a direction perpendicular to the information record surface by an actuator etc., so that the focus error signal $S_{FE}$ becomes "0" when a servo loop of a focus servo for this S curve (i.e., the focus error signal $S_{FE}$) is in a servo close condition.

At this time, the S curve shown in FIG. 6 is obtained as follows. Namely, in case of the focus servo control by means of the astigmatic method for example, the reflection light of the light beam, to which an astigmatism is given, is received or detected by a four divided light detector. Then, a difference between (i) a signal obtained by adding detection signals of two light-detecting portions on one diagonal line of the four divided light detector and (ii) a signal obtained by adding detection signals of two light-detecting portions on another diagonal line of the four divided light detector is calculated. Such an S curve calculated as the difference has an output voltage corresponding to a focus error amount of the focal position with respect to the information record surface.

Since the S curve is generated on the basis of the reflection light of the light beam as described above, it is difficult to obtain an accurate S curve under a circumstance that the intensity of the reflection light cannot be sufficiently obtained.

Therefore, a so-called focus OK signal (which is a signal indicative of an allowance to change the open condition of the focus servo loop to the close condition, and which will be simply referred to as an "FOK signal" hereinafter) is generated when the intensity of the reflection light exceeds a predetermined threshold level, and the open condition of the servo loop is changed to the close condition after this FOK signal is actually generated, to thereby obtain the S curve. This predetermined threshold value to generate the FOK signal is fixed after an adjustment at the time of manufacture.

However, in case of optically recording or reproducing the information with respect to the information record medium, an disturbance light such as a light from an external portion of the information recording or reproducing apparatus or a light due to a reflection within the information recording or reproducing apparatus may be irradiated onto the light detecting element, which is supposed to receive or detect the reflection light, in addition to the reflection light to be detected.

The intensity of this disturbance light may change in accordance with a change of a circumstance where the information recording or reproducing apparatus is installed, or may change due to an aged deterioration.

On the other hand, the above mentioned predetermined threshold level is set in advance in consideration with the influence of the disturbance light (i.e., so as to generate the FOK signal normally even in such a condition that the intensity of an expected disturbance light is added on the intensity of an original reflection light). However, if the intensity of the disturbance light changes as mentioned above, there arises a following problem. Namely, if the intensity of the disturbance light decreases, even in such a condition that a sufficient intensity of the reflection light is obtained, the intensity of the total of the reflection light and the disturbance light may not exceed the predetermined threshold value, resulting in that the FOK signal cannot be generated at the timing when the FOK signal is to be generated. Alternatively, if the intensity of the disturbance light increases, even in such a condition that a sufficient intensity of the reflection light is not obtained, the intensity of the total of the reflection light and the disturbance light may exceed the predetermined threshold value, resulting in that the FOK signal is generated at the timing when the FOK signal is not to be generated (e.g., the FOK signal is kept to be generated) or is not generated at the timing when the FOK signal is to be generated.

If there arises the above mentioned problem as for the generation timing of the FOK signal, the open condition of the focus servo loop cannot be changed to the close condition at an appropriate timing, resulting in that it is difficult or impossible to perform an accurate focus servo control, which is a problem.

SUMMARY OF THE INVENTION

It is therefore an object of the present invention to provide a focus servo controlling apparatus, which can perform a focus servo control by accurately changing the open condition of the focus servo loop to the close condition even if the intensity of the disturbance light and the intensity of the reflection light change due to the aged deterioration etc., and which enables an operation of accurately recording or reproducing the information optically, and also an information recording apparatus having such a focus servo controlling apparatus, as well as an information reproducing apparatus having such a focus servo controlling apparatus.

The above object of the present invention can be achieved by a focus servo controlling apparatus for performing a focus servo control by changing a condition of a focus servo loop from an open condition to a close condition in correspondence with a level of a reflection light signal, which is obtained as a reflection light of a light beam reflected from an information record medium is detected by a light receiving element such as an optical pickup. The focus servo controlling apparatus is provided with: a disturbance level detecting device such as a servo control circuit for detecting a level of a disturbance light signal, which is obtained as a disturbance light other than the reflection light is received by the light receiving element; and a controlling device such as a system controller for setting a level, which is larger than the level of the disturbance light signal detected by the disturbance level detecting device, as a threshold level and for changing the condition of the focus servo loop from the open condition to the close condition on the basis of a timing when the level of the reflection light signal becomes equal to or larger than the set threshold level.

According to the servo controlling apparatus of the present invention, since the threshold level is variable to be larger than the level of the disturbance light signal and since the focus servo loop is transferred into the close condition on the basis of the timing when the reflection light signal becomes equal to or larger than the threshold level, it is possible to transfer the focus servo loop into the close condition precisely by eliminating the influence of a change in the level of the disturbance light signal even if the level of the disturbance light signal changes.

Accordingly, even if the level of the disturbance light signal changes due to the aged deterioration or the like, it is possible to perform optically reproducing or recording the information accurately by performing the focus servo with precisely transferring the focus servo loop into the close condition.

In one aspect of the focus servo controlling apparatus, the controlling device sets as the threshold level a level obtained by adding an addition level, which is set in advance on the basis of a minimum level of the reflection light signal detected in advance, onto the level of the disturbance light signal detected by the disturbance level detecting device.

According to this aspect, since the level obtained by adding the addition level, which is set in advance on the basis of the minimum level of the reflection light signal, onto the level of the disturbance light signal is set as the threshold level, it is possible to precisely transfer the focus servo loop into the close condition by means of a relatively simplified structure.

In another aspect of the focus servo controlling apparatus, the apparatus is further provided with a minimum level detecting device such as a servo control circuit for detecting a minimum level of the reflection light signal. The controlling device sets the threshold level to be less than the detected minimum level.

According to this aspect, even if the minimum level of the reflection light signal changes while the level of the disturbance light signal changes, it is still possible to precisely and surely transfer the focus servo loop into the close condition.

In another aspect of the focus servo controlling apparatus, the apparatus is further provided with a timing signal generating device such as a servo control circuit for generating a timing signal indicating a timing when the reflection light signal becomes equal to or larger than the set threshold level. The controlling device changes the condition of the focus servo loop from the open condition to the close condition after the timing signal is generated by the timing signal generating device.

According to this aspect, since the focus servo loop is transferred into the close condition on the basis of the timing signal, it is possible to surely transfer the focus servo loop into the close condition.

The above object of the present invention can be also achieved by an information reproducing apparatus provided with: (i) the above described focus servo controlling apparatus of the present invention (including its various aspects): (ii) a light emitting device such as an optical pickup for emitting the light beam onto the information record medium while performing a focus servo control by the focus servo loop in the close condition, and (iii) a reproducing device such as an EFM (Eight to Fourteen Modulation) encoder/decoder for reproducing information recorded on the information record medium on the basis of the reflection light signal.

According to the information reproducing apparatus of the present invention, it is possible to precisely reproduce the information by surely performing the focus servo control with precisely transferring the focus servo loop into the close condition, even if the level of the disturbance light signal changes.

The above object of the present invention can be also achieved by an information recording apparatus provided with: (i) the above described focus servo controlling apparatus of the present invention (including its various aspects); and (ii) a recording device such as an EFM encoder/decoder for emitting the light beam, which corresponds to record information to be recorded, onto the information record medium while performing a focus servo control by the focus servo loop in the close condition, to thereby record the record information onto the information record medium.

According to the information recording apparatus of the present invention, it is possible to precisely record the record information onto the information record medium by surely performing the focus servo control with precisely transferring the focus servo loop into the close condition, even if the level of the disturbance light signal changes.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 1 is a block diagram of an MD recording and reproducing apparatus as an embodiment of the present invention;

DETAILED DESCRIPTION OF THE PREFERRED EMBODIMENTS

Referring to the accompanying drawings, an embodiment of the present invention will be now explained.

The embodiment described hereinafter is an embodiment in which the present invention is applied to a focus servo control in an MD (Mini Disc) recording and reproducing apparatus capable of reproducing music information etc., from a so-called pre-mastered MD (music MD) exclusive for reproducing, among various types of MDs which are popular as small and light optical discs, and also capable of recording and reproducing music information etc., with respect to a so-called recordable MD which is recordable for a user.

(I) Embodiment of MD

First of all, before explaining the MD recording and reproducing apparatus of the present embodiment, the MD itself on which the music information is recorded or reproduced by the MD recording and reproducing apparatus is explained with reference to FIG. 1 and FIG. 2A to FIG. 2D.

As shown in FIG. 1, an MD 20 as one example of the information record medium is provided with an optical disc main body 21 and a cartridge 22 for protecting the optical disc main body 21.

Here, there are various types of MDs as the MD 20. Hereinafter, the case is explained as for the MD recording and reproducing apparatus capable of recording and reproducing the music information with respect to (i) the pre-mastered MD on which the music information or the like is recorded in advance and (ii) the above mentioned recordable MD using the MO (Magneto-Optical) disc. In the following explanation, the details of the recordable MD and the pre-mastered MD are explained at first.

Figure 2A:
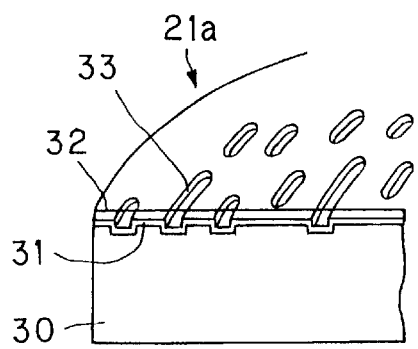
FIG. 2A is a partially broken perspective view of a pre-mastered MD in the embodiment.

As shown in FIG. 2A, an optical disc main body 21*a* as a pre-mastered MD has a structure similar to that of the CD (Compact Disc), in which a reflection film 31 and a protection film 32 is formed on a substrate 30 made from polycarbonate, and on which a pit array 33 is formed in the same manner as the CD.

The address, which is an absolute address indicative of a record position on the optical disc main body 21*a*, is recorded in a block header of the data etc., in the same manner as the CD-ROM (CD-Read Only Memory).

In case of such an MD, a portion where the information of any kind is recorded is called as an "information area". In case of the pre-mastered MD, as sown in FIG.2B, an information area 26 has a lead in area 23 where the table of contents information or the like is recorded, a program area 24 where the music information or the like is actually recorded and a lead out area 25.

Figure 2C:
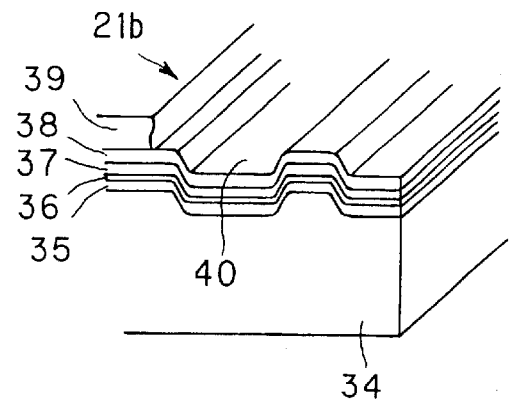
FIG. 2C is a partially broken perspective view of a recordable MD in the embodiment.
Figure 2B:
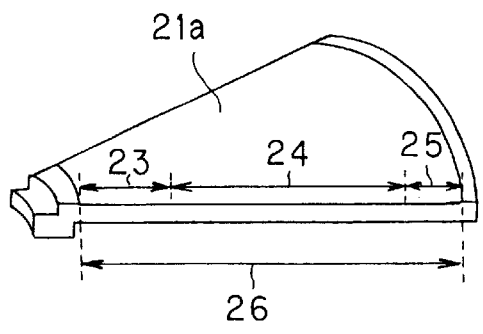
FIG. 2B is a partially broken perspective view of the pre-mastered MD showing its area divisions in the embodiment.

On the other hand, as shown in FIG.2C, in case of the optical disc main body 21*b* as the recordable MD, a dielectric film 35, an MO film 36, a dielectric film 37, a reflection film 38 and a protection film 39 are formed on a substrate 34 made from polycarbonate, and further a guide groove 40 which is simply called as a pre-groove is formed.

The guide groove 40 is wobbling at an FM modulated frequency such that the address which is the absolute address indicative of the record position on the optical disc main body 21*b* is recorded thereon as the change in the aspect of wobbling.

Figure 2D:
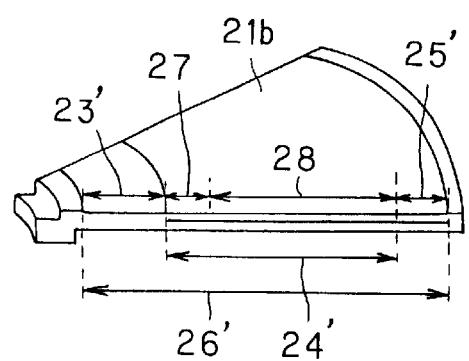
FIG. 2D is a partially broken perspective view of the recordable MD showing its area divisions in the embodiment.

As shown in FIG. 2D, in case of the recordable MD, an information area 26' has: a lead in area 23' where predetermined control information or the like is recorded; a recordable area 24' where music information etc., and the table of contents information, etc., can be recorded; and a lead out area 25' in the same manner as the pre-mastered MD.

Further, the recording area 24' has (i) a UTOC (User Table Of Contents) area 27 where UTOC information including the table of contents information etc., is recorded and (ii) a program area 28 where the music information or the like is actually recorded.

At this time, since the guide groove 40 is formed all over the recordable area 24', the address can be read even in case of the recordable MD on which no music information or the like is recorded yet. Furthermore, since the address can be read, it is possible to identify onto which position within the information area 26' the optical pickup irradiates the light beam.

Next, in the above described pre-mastered MD or recordable MD, the optical disc main body 21 is accommodated in the cartridge 22. On the back surface of the cartridge 22, an MD type distinguishable aperture (not illustrated) is formed so as to distinguish the pre-mastered MD and the recordable MD from each other, in addition to an erroneous recording protection aperture (not illustrate) to prevent the MD from being erroneously recorded. At this time, the MD type distinguishable aperture is formed in case of the recordable MD, while the MD type distinguishing aperture is not formed in case of the pre-mastered MD, for example.

Therefore, by detecting the aperture condition of the MD type distinguishable aperture, it is possible to judging whether the MD 20 loaded on the MD recording and reproducing apparatus shown in FIG. 1 is the pre-mastered MD or the recordable MD.

(II) Embodiment of MD Recording and Reproducing Apparatus

Next, the structure and the operation on the whole of the MD recording and reproducing apparatus, onto which the above described MD 20 can be loaded, will be explained with reference to FIG. 1.

As shown in FIG. 1, an MD recording and reproducing apparatus 100 is provided with: a spindle motor 1; an optical pickup 2 as a light irradiating device and a light receiving device including an actuator for driving an objective lens (not illustrated), which collects a light beam onto an information record surface of the MD 20; a magnetic head 3; a carriage 4; a head driver circuit 5; an address decoder 6, an RF (Radio Frequency) amplifier 7; a servo control circuit 8 as (i) a detecting device for generating a FOK signal and a focus error signal and also (ii) a minimum level detecting device and a timing signal generating device; an EFM (Eight to Fourteen Modulation) encoder/decoder 9 as a reproducing device and a recording device; a system controller 10 as a controlling device; a DRAM (Dynamic Random Access Memory) control circuit 11; a DRAM 12; a data compression encoder 13; a data compression decoder 14; an A/D convertor 15; a D/A convertor 16; a display unit 17; and a key input unit 18.

Next, a whole operation is explained.

At first, the spindle motor 1 is controlled by the servo control circuit 8 so as to rotate the optical disc main body 21 in the MD 20 at a constant linear velocity.

The optical pickup 2 irradiates the light beam such as a laser light onto the rotated optical disc main body 21, detects the reflection light thereof, generate an RF signal corresponding to the music information etc., recorded on the optical disc main body 21 on the basis of the reflection light, and outputs it to the RF amplifier 7.

Then, the RF amplifier 7 applies a predetermined process such as an amplifying process at a predetermined gain onto this RF signal, and outputs it to the servo control circuit 8 and the EFM encoder/decoder 9.

Here, the principle of taking out the RF signal from the reflection light is explained for each of the above mentioned types of the MDs.

At first, in case of the recordable MD, the digital signals "1" and "0" are recorded by changes of the magnetic polarity N and the magnetic polarity S.

Then, when the light beam is irradiated from the optical pickup 2 onto the information record surface, on which the digital signals are recorded in this manner, because of the magnetic Kerr effect at the MO film 36 of the optical disc main body 21b, the light polarization plane of the reflection light of the light beam is slightly rotated in the forward direction or the reverse direction in correspondence with the changes in the magnetic polarities.

On the other hand, as the reflection light passes through the polarization beam splitter, the distribution amounts of the reflection light to two light receiving elements equipped in the optical pickup 2 are changed in correspondence with the magnetic polarity N and the magnetic polarity S.

Therefore, it is possible to read the digital signal "1" or "0" included in the RF signal at the EFM encoder/decoder 9 etc., by obtaining the difference between the outputs of the two light receiving elements at the RF amplifier 7.

In contrast, in case of the pre-mastered MD, when the light beam is irradiated from the optical pickup 2 onto the pre-mastered MD, the difference in the light reflection amounts is generated due to the diffraction between the portion where the pit is formed and the portion where the pit is not formed, in the same manner as the CD.

Therefore, in this case, it is possible to read the digital signal "1" or "0" included in the RF signal at the EFM encoder/decoder 9 etc., by adding the outputs of the two light receiving elements equipped in the optical pickup 2 and adding them at the RF amplifier 7 and by the largeness or smallness of the result of this addition.

Thus, the RF amplifier 7 has two types of operation amplifiers i.e., one operation amplifier connected so as to obtain the difference of the outputs of the two light receiving elements and another amplifier connected so as to add the outputs of the two light receiving elements.

By such a structure, it is possible to reproduce the pre-mastered MD and the recordable MD as the MD 20 by selecting one of those two operation amplifiers in correspondence with the result of distinguishing the type of the MD 20 loaded onto the MD recording and reproducing apparatus 100.

Next, the address decoder 6 reads the address by detecting the wobbling frequency out of the inputted RF signal at the time of reproducing the recordable MD. By the address decoder 6, it is possible to read the address of the optical disc main body 21b even in the information non-recorded area of the recordable MD, so that it is possible for the system controller 10 etc., to recognize which position on the optical disc main body 21b is irradiated with the light beam by the optical pickup 2.

In case of reproducing the pre-mastered MD, since the address is recorded to the block header etc., of the pre-mastered MD in the same manner as the CD, it is performed to read the address by reading the block header or the like.

On the other hand, the EFM encoder/decoder 9 is a circuit having both functions of the EFM encoder and the EFM decoder.

The EFM encoder/decoder 9 functions as the EFM encoder at the time of recording the music information etc., and encodes the signal to be recorded by means of the EFM method. At this time, with respect to the recordable MD, recording by means of the light modulating method as in the case of the CD-R (CD-Recordable) is not performed but recording by means of the magnetic modulating method is performed. Thus, the EFM modulated signal is supplied to the head driver circuit 5.

The EFM encoder/decoder 9 functions as the EFM decoder at the time of reproducing the music information etc., so as to extract the EFM signal out of the RF signal amplified by the RF amplifier 7 and then decode it.

Further, the head driver circuit 5 is a circuit for driving the magnetic head 3 on the basis of the EFM-modulated record signal (which includes the music information etc., to be recorded on the recordable MD). When the magnetic head 3 is driven, the magnetization due to the magnetic polarity is performed on the basis of the EFM-modulated record signal at a position of the MO film 36 of the recordable MD, which is heated up to a temperature higher that the Curie temperature by the light beam emitted from the optical pickup 2.

Here, in the light modulating method, a so-called "tear shaped pit" may be likely generated, in which the lead portion of the pit where the irradiation of the light beam starts is relatively small while the tail portion of the pit is relatively large. This tear shaped pit may cause a change or fluctuation (i.e., jitter) of the recorded signal on the time axis at the time of reading it out.

In contrast, according to the magnetic modulating method, since the light beam is kept to be irradiated at a constant light intensity, such a symmetrical shape that the magnetic polarity N and the magnetic polarity S are continuously arranged is obtained on the information record surface. This result in an advantage of being less influenced by a tilt of the optical disc main body 21b.

Next, the DRAM 12 temporarily stores the music information or the like by an information amount of about 1 Mega Bits, at the time of reproducing and recording the music information or the like. The DRAM 12 is installed so as to prevent the discontinuity of the music sound etc., due to the vibration of the MD recording and reproducing apparatus 100 itself.

Further, the DRAM control circuit 11 controls the input and output of the music information etc., for the DRAM 12 by outputting a predetermined control signal to the DRAM 12.

In this case, at the time of reproducing the music information etc, the data decoded by the EFM encoder/decoder 9 is inputted and written into the DRAM 12. On the other hand, at the time of recording the music information etc., the data is read out from the DRAM 12 and is outputted to the EFM encoder/decoder 9.

At this time, the operation of the DRAM control circuit 11 is controlled by the system controller 10, such that the system controller 10 controls the operation of the DRAM control circuit 11 in synchronization with the recording timing of the music information etc., with respect to the optical disc main body 21b and the reproducing timing of the music information etc., from the optical disc main body 21.

Next, the A/D convertor 15 converts the analog information signal inputted from the external at the time of recording the audio information etc., to the digital information signal to be included in the record signal. Here, the sampling frequency of the A/D conversion is 44.1 kHz (kilo Hertz), for example.

By this, the data compression encoder 13 performs a compression of the digital information signal by the ATRAC (Adaptive Transform Acoustic Coding) method. AT this time, by the ATRAC method, the data amount is reduced to about 1/5 such that the A/D converted data are not simply thinned out but are compressed by using the masking effect and the minimum audible characteristic of the sense of hearing of a human being.

On the other hand, the data compression decoder 14 expands the EFM-decoded data read out from the optical disc main body 21 at the time of reproducing the audio information etc., by a method which is the inverse of the ATRAC method, to thereby output the digital audio signal.

Then, the D/A converter 16 converts the reconstructed digital audio signal to an analog signal and outputs it to the external.

In those operations, the carriage 4 moves the optical pickup 2 and the magnetic head 3 in the radial direction of the optical disc main body 21.

The magnetic head 3 is fixed to the optical pickup 2 through an arm etc., and is constructed to move in one body with the optical pickup 2 while sandwiching the optical disc main body 21 with the optical pickup 2. By such a movement, the optical pickup 2 and the magnetic head 3 can be moved to a position opposed to a desired address area on the optical disc main body 21, so that it is possible to certainly reproduce and record the music information etc., with respect to the desired address area.

At this time, the servo control circuit 8 for performing a driving control of the spindle motor 1 or the like performs the servo controls of the carriage 4, the spindle motor 1 as well as the actuator (not illustrated) of the optical pickup 2.

Firstly, the servo control circuit 8 generates a control signal to control an actuator (not illustrated) of the optical pickup 2 and the carriage 4 on the basis of the RF signal from the RF amplifier 7, and performs the tracking servo control so that the irradiation position of the light beam is positioned on the record track axis line of the optical disc main body 21.

Secondly, the servo control circuit 8 generates a control signal to control the actuator (not illustrated) of the optical pickup 2 on the basis of the RF signal, and performs the focus servo control so that the light beam is focused on the information record surface of the optical disc main body 21. At this time, in the servo control circuit 8, the focus servo control is performed by generating a focus error signal $S_{FE}$ described later in detail (including the aforementioned S curve) by the astigmatic method for example, on the basis of the intensity of the RF signal. Then, the timing of changing the open condition of the focus servo loop to the close condition is set on the basis of the FOK signal, which is generated on the basis of the intensity of an all light amount signal.

Here, the all light amount signal is a signal obtained by adding all signals of all light receiving elements of the optical pickup 2 at the RF amplifier 7. The all light amount signal is the above mentioned RF signal at the stage of starting reproducing or recording the music information etc., after the focus servo loop is set in the close condition.

Thirdly, the servo control circuit 8 performs the spindle servo control, by outputting a control signal to rotate the spindle motor 1 at a constant linear velocity on the basis of a clock signal included in the EFM signal from the EFM decoder 9.

Along with those servo control operations, the system controller 10 controls the operations of each constitutional elements of the MD recording and reproducing apparatus 100. At this time, the system controller 10 controls the MD recording and reproducing apparatus 100 on the whole, and especially controls the focus bias voltage which is described later in detail.

Further, the operation command from the external to command the system controller 10 so as to perform the desirable control operation is inputted by the key input unit 18.

On the basis of the inputted operation command, the system controller 10 outputs the control signals to the respective constitutional elements of the MD recording and reproducing apparatus 100, to thereby control them to perform the fast search operation, the random access reproduction operation and so forth.

The operation condition of the MD recording and reproducing apparatus 100 is displayed by the display unit 17.

Next, the processes of generating the FOK signal in the servo control circuit 8 and setting the focus servo loop into the close condition by the FOK signal are explained with reference to FIG. 3.

Figure 3:
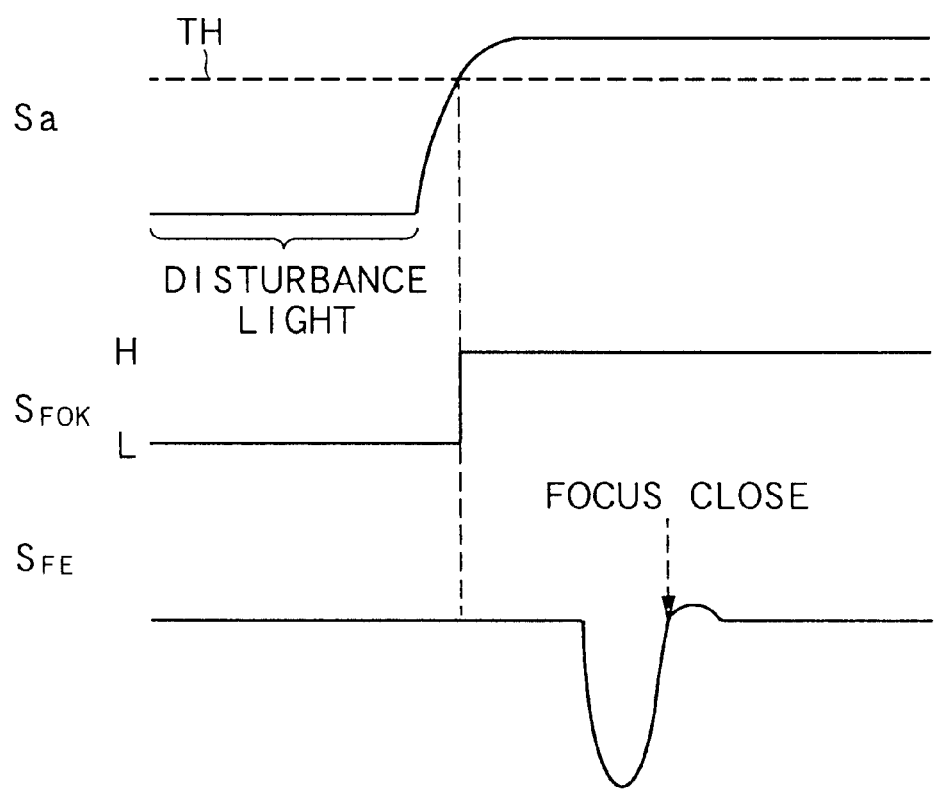
FIG. 3 is a timing chart showing a relationship between an FOK signal and other signals in the embodiment.

As shown in FIG.3 at the top stage thereof, an all light amount signal Sa consists of only the light component outputted as a disturbance light (e.g., a disturbance light from the external of the apparatus and/or a disturbance light reflected in the apparatus) other than the reflection light from the MD 20 to be received at the time of recording or reproducing is inputted to and received by the light receiving elements in the optical pickup 2, in a condition where the semiconductor laser in the optical pickup 2 is just driven before starting the operation of recording or reproducing (i.e., a condition where the MD 20 is not loaded yet).

Then, after the MD 20 is loaded in the MD recording and reproducing apparatus 100 and the recording or reproducing operation is started, since the intensity of the reflection light becomes stronger than that of the disturbance light, the level of the all light amount signal Sa increases as indicated by the top stage of FIG. 3.

At this time, after the level of the all light amount signal Sa exceeds the threshold level TH, which is to judge whether the level of the all light amount signal Sa is enough to perform the focus servo control accurately, the open condition of the focus servo loop is changed to the close condition, so that the focus servo control is actually started.

More concretely, as indicated by the middle stage of FIG. 3, the FOK signal $S_{FOK}$, which changes from the "L" level to the "H" level when the level of the all light signal Sa exceeds the threshold level TH, is generated in the servo control circuit 8. The level of the FOK signal $S_{FOK}$ is always monitored at the time of starting the recording or reproducing operation. Then, the open condition of the servo loop is changed to the close condition at the zero cross timing of the S curve (refer to the bottom stage of FIG. 3), which is firstly generated after the level of the FOK signal $S_{FOK}$ becomes the "H" level, so that the focus servo control is started.

In the servo control circuit 8 explained hereinafter, the FOK signal $S_{FOK}$ is generated such that the value of the threshold level TH is variable depending upon the level of the all light amount signal Sa corresponding to the disturbance light (refer to the top stage of FIG. 3).

(iii) Embodiment of Focus Servo Control

Next, the focus servo control performed by the servo control circuit 8 and the system controller 10 in the MD recording and reproducing apparatus 100 is explained with reference to FIG. 4, FIG. 5A and FIG. 5B.

Figure 4:
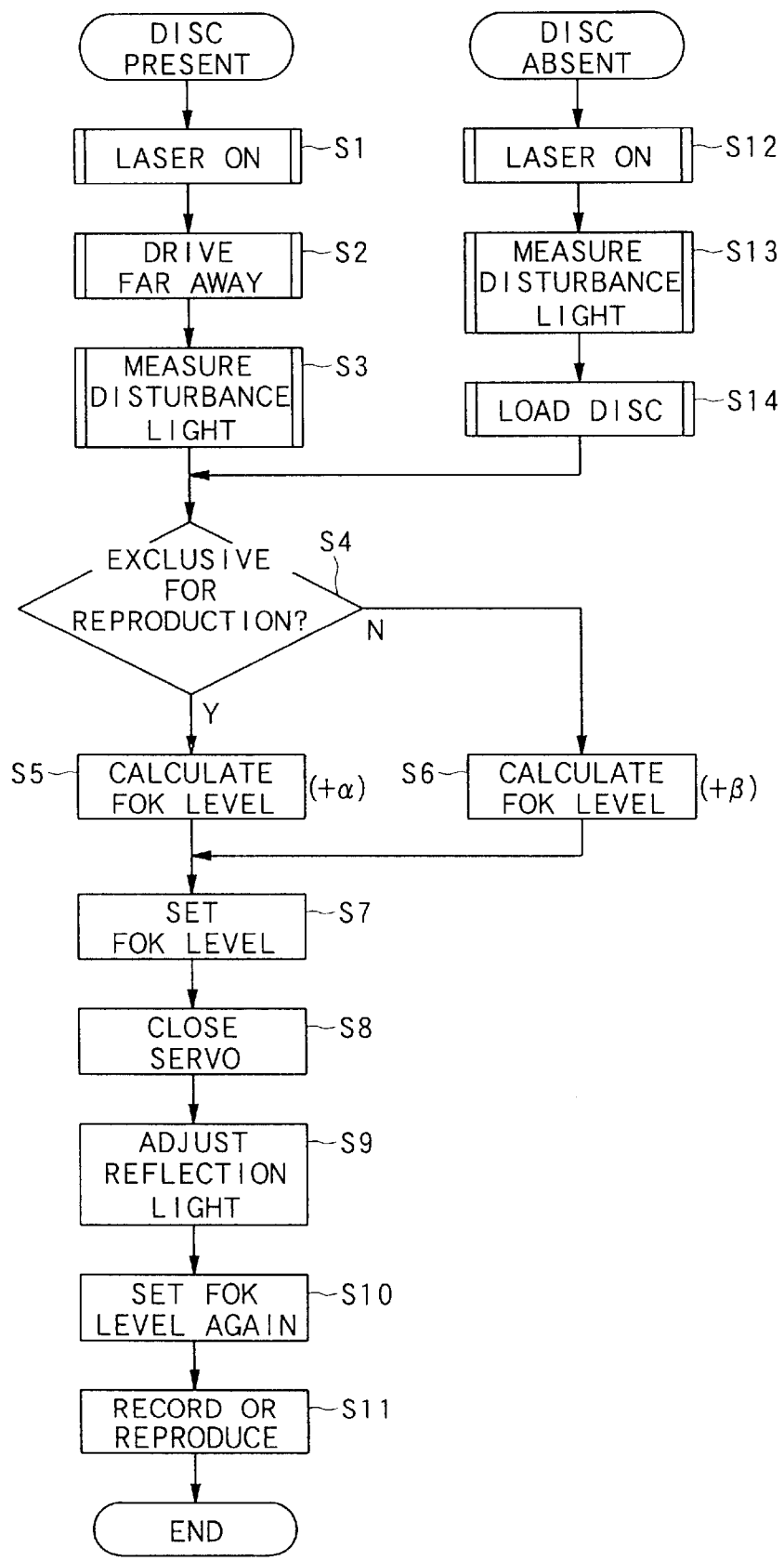
FIG. 4 is a flowchart showing a focus servo control in the embodiment.

As shown in FIG. 4, in the focus servo control, if either one type of the MD 20 is already loaded in the MD recording and reproducing apparatus 100, the semiconductor laser (not illustrated) in the optical pickup 2 is firstly driven to emit the light beam for recording or reproducing (step S1). Then, the objective lens (not illustrated) in the optical pickup 2 (which is an objective lens to collect the light beam for recording or reproducing onto the MD 20) is driven to be far away from the MD 20 (step S2). Then, the level of the all light amount signal Sa generated by the incident disturbance light under a condition that the influence of the reflection light from the MD 20 is sufficiently eliminated (which is simply called as a "disturbance light level" hereinafter) is detected (step S3).

Then, it is judged whether the MD 20 loaded in the MD recording and reproducing apparatus 100 is the recordable MD or the pre-mastered MD i.e., the MD exclusive for reproduction (step S4).

The judging method at the step S4 may be actually performed by detecting the MD type distinguishable aperture, which is formed in the cartridge 22, as described before.

Namely, the disc loading portion of the MD recording and reproducing apparatus 100 is provided with a sensor for detecting the condition of the MD type distinguishable aperture. The system controller 10 distinguishes the type of the loaded MD 20 in accordance with the output of this sensor (e.g., it is the recordable MD if the MD type distinguishable aperture is open while it is the pre-mastered MD if the MD type distinguishable aperture is closed), to thereby output the result of distinguishing to the servo control circuit 8.

Next, according to the judgment at the step S4, if the loaded MD 20 is the pre-mastered MD (step S4: YES), the system controller 10 calculates the threshold level TH corresponding to the pre-mastered MD by adding an addition level α, which is set in advance so as to obtain the threshold level TH (refer to the top stage of FIG. 3) by adding the addition level α onto the detected disturbance light level when the pre-mastered MD is loaded in the MD recording and reproducing apparatus 100, onto the detected disturbance light level (step S5), to thereby output the calculated threshold level TH to the servo control circuit 8 and set it for generating the FOK signal $S_{FOK}$ (step S7).

Here, for example, assuming that the disturbance light level is 20 millivolt, the value of the addition level α is set to 100 millivolt. The value of the addition level α is actually set such that the value obtained by adding the addition value α onto the disturbance light level becomes less than the value experimentally obtained in advance as a minimum level of the all light amount signal Sa generated by the reflection light from the pre-mastered MD after the focus servo loop is transferred into the close condition.

On the other hand, according to the judgment at the step S4, if the loaded MD 20 is the recordable MD (step S4: NO), the system controller 10 calculates the threshold level TH corresponding to the recordable MD by adding an addition level β, which is set in advance so as to obtain the threshold level TH (refer to the top stage of FIG. 3) by adding the addition level β onto the detected disturbance light level when the recordable MD is loaded in the MD recording and reproducing apparatus 100, onto the detected disturbance light level (step S6), to thereby output the calculated threshold level TH to the servo control circuit 8. Then, the operation flow proceeds to the step S7, where this calculated threshold level TH is set for generating the FOK signal $S_{FOK}$.

Here, for example, assuming that the disturbance light level is 20 millivolt, the value of the addition level β is set to 200 millivolt. The value of the addition level β is actually set such that the value obtained by adding the addition value β onto the level of the all light amount signal Sa, which is obtained by amplifying the signal due to the incident disturbance light generated at the optical pickup 2 by the RF amplifier 7 (wherein the gain of the RF amplifier 7 is larger than that for the pre-mastered MD since the reflection light itself is weak if the loaded MD 20 is the recordable MD), becomes less than the value experimentally obtained in advance as a minimum level (which is larger than that for the pre-mastered MD since it is amplified by the RF amplifier 7 whose gain is the larger) of the all light amount signal Sa generated by the reflection light from the recordable MD after the focus servo loop is transferred into the close condition.

After the process of setting the threshold level TH is completed, the focus servo loop is transferred into the close condition on the basis of the FOK signal $S_{FOK}$ generated in correspondence with the set threshold level TH (step S8), and the reflection light is received from the MD 20.

Then, the gain of the RF amplifier 7 is adjusted such that the maximum level of the all light amount signal Sa obtained by receiving the reflection light becomes a constant value, which is set in advance for respective one of the types of the MD 20 (step S9). Then, the threshold level TH which has been once set at the step S7 is set again (step S10).

In the process of setting the FOK level again at the step S10, the threshold level TH is set again such that the new threshold level TH becomes sufficiently larger than the level after the disturbance light level detected at the step S3 is changed by the adjustment at the step S9 and also becomes sufficiently smaller than the minimum level of the all light amount signal Sa after the adjustment at the step S9.

Then, while setting the focus servo loop into the close condition on the basis of the FOK signal $S_{FOK}$ generated in correspondence with the threshold level TH after setting it again, the focus servo control is performed so that the recording or reproducing the information with respect to the MD 20 is performed (step S11), and the processes are ended.

On the other hand, if the MD 20 is not firstly loaded in the MD recording and reproducing apparatus 100, the light beam for recording or reproducing is emitted by driving the semiconductor laser in the optical pickup 2 (step S12). Then, the disturbance light level is detected (step S13). After loading the MD 20, which is to be recorded or reproduced, into the MD recording and reproducing apparatus 100 (step S14), the operation flow proceeds to the step S4, where the focus servo control is performed by performing the above mentioned processes from the step S4 to the step S11 in the same manner By setting the threshold value TH in the above described processes, even if the disturbance light level increases up to a level indicated by a solid line from a level indicated by a chain line due to an aged deterioration or the like as shown in FIG. 5A, the FOK signal $S_{FOK}$ can be appropriately generated since the threshold level TH is changed to the threshold level TH' in correspondence with this increase of the disturbance light level.

Figure 5A:
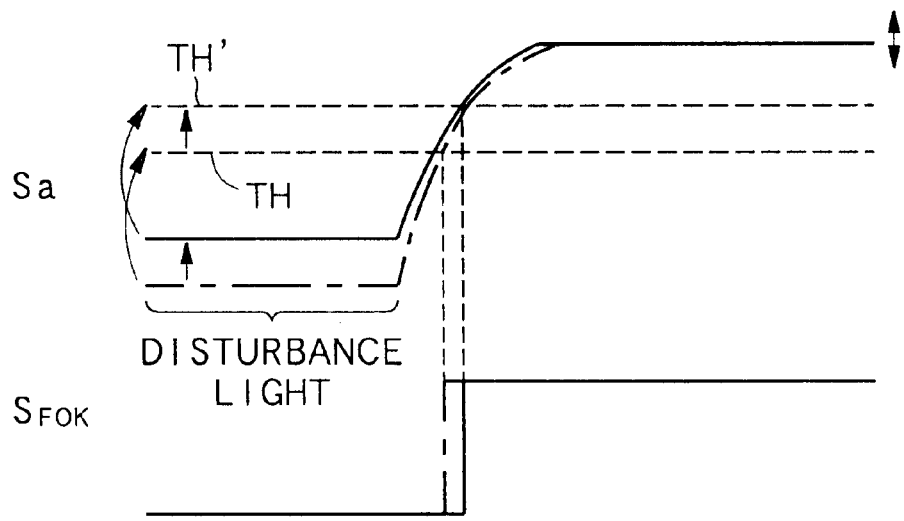
FIG. 5A is one diagram for explaining a threshold in the embodiment.
Figure 5B:
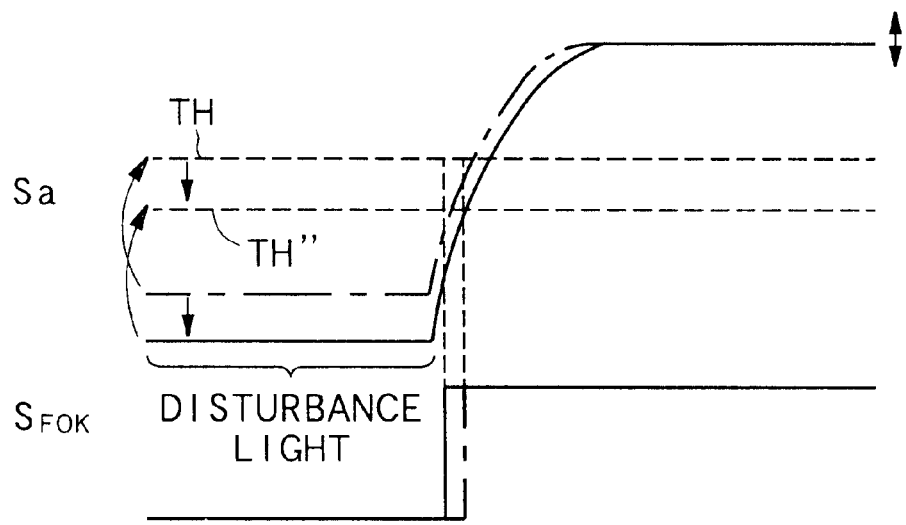
FIG. 5B is another diagram for explaining a threshold in the embodiment.
Figure 6:
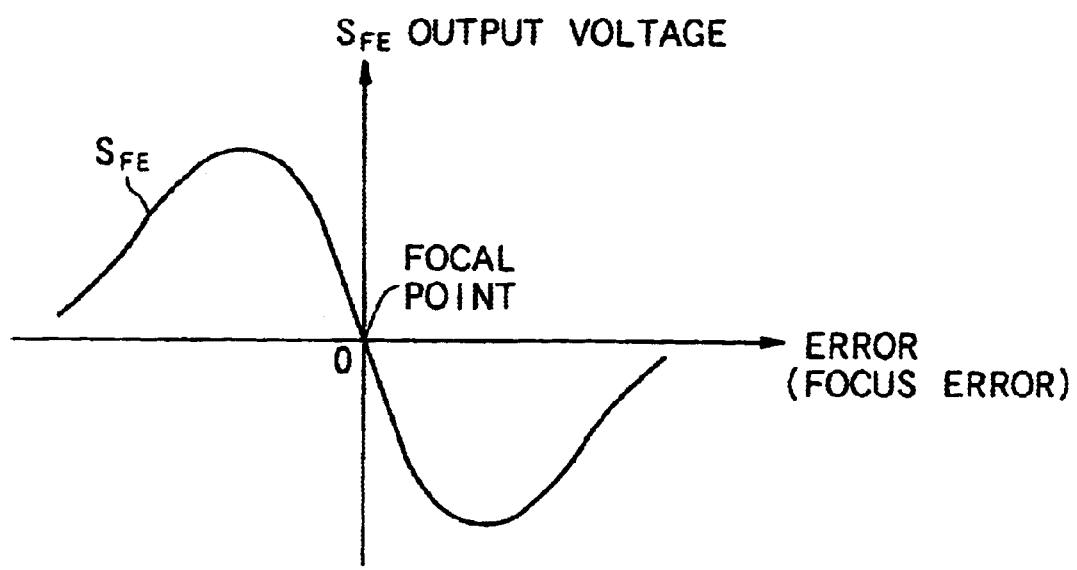
FIG. 6 is a diagram for explaining a focus servo control.

Similarly, even if the disturbance light level decreases down to a level indicated by a solid line from a level indicated by a chain line due to an aged deterioration or the like as shown in FIG. 5B, the FOK signal $S_{FOK}$ can be appropriately generated since the threshold level TH is changed to the threshold level TH' in correspondence with this decrease of the disturbance light level.

Further, even if the minimum level of the all light amount signal Sa obtained after the focus servo loop is transferred into the close condition (i.e., the minimum level of the all light amount signal Sa within the time duration when the level of the all light amount signal Sa is stabilized after the increase in FIG. 5A or 5B) is changed due to the aged deterioration or the like as shown in FIG. 5A or 5B, sine the threshold level TH is set again at the steps S9 and S10, the FOK signal $S_{FOK}$ can be appropriately generated as the threshold level TH (TH' or TH") is set so as not to exceed this minimum level.

As described above in detail, according to the focus servo control in the present embodiment, since the threshold level TH is variable so as to be larger than the disturbance light level and since the focus servo loop is transferred into the close condition on the basis of the timing when the level of the all light amount signal Sa generated by the incident reflection light reaches the threshold level TH, it is possible to set the focus servo loop into the close condition accurately by eliminating the influence of the change of the disturbance light level.

Since the level obtained by adding the addition level α or β, which is set in advance on the basis of the minimum level of the all light amount signal Sa generated by the incident reflection light from the MD 20 after the focus servo loop is transferred into the close condition, onto the disturbance light level is set as the threshold level TH, it is possible to set the focus servo loop into the close condition accurately by use of a relatively simplified structure.

Further, since the threshold level TH is set such that the threshold level TH becomes smaller than the minimum level detected after the focus servo loop is transferred into the close condition, it is possible to set the focus servo loop into the close condition accurately and surely even if the minimum level changes while the disturbance light changes.

Furthermore, since the focus servo loop is transferred into the close condition on the basis of the FOK signal $S_{FOK}$, it is possible to surely set the focus servo loop into the close condition.

It is also possible to perform the focus servo control while setting the focus servo loop into the close condition accurately, and to thereby reproduce the information accurately from the pre-mastered MD.

Even if the level of the disturbance light signal changes, it is possible to surely perform the focus servo control by setting the focus servo loop into the close condition accurately, to thereby record the information accurately onto the recordable MD.

In the above described embodiment, the addition levels α and β are set on the basis of the minimum level of the all light amount signal Sa after the focus servo loop is transferred into the close condition, which is experimentally obtained in advance. Other than this, the minimum level of the all light amount signal Sa before the focus servo loop is transferred into the close condition may be actually detected, and the threshold level TH may be calculated by setting the addition levels α and β such that the threshold level is set less than this detected minimum level.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.11-288051 filed on Oct. 8, 1999 including the specification, claims, drawings and summary is incorporated herein by reference in its entirety.

What is claimed is:

1. A focus servo controlling apparatus for performing a focus servo control by changing a condition of a focus servo loop from an open condition to a close condition in correspondence with a level of a reflection light signal, which is obtained as a reflection light of a light beam reflected from an information record medium is detected by a light receiving element, said apparatus comprising:

a disturbance level detecting device for detecting a level of a disturbance light signal, which is obtained as a disturbance light other than the reflection light is received by said light receiving element; and a controlling device for setting a level, which is larger than the level of the disturbance light signal detected by said disturbance level detecting device, as a threshold level and for changing the condition of the focus servo loop from the open condition to the close condition on the basis of a timing when the level of the reflection light signal becomes equal to or larger than the set threshold level.

2. A focus servo controlling apparatus according to claim 1, wherein said controlling device sets as the threshold level a level obtained by adding an addition level, which is set in advance on the basis of a minimum level of the reflection light signal detected in advance, onto the level of the disturbance light signal detected by said disturbance level detecting device.

3. A focus servo controlling apparatus according to claim 1, further comprising a minimum level detecting device for detecting a minimum level of the reflection light signal, said controlling device setting the threshold level to be less than the detected minimum level.

4. A focus servo controlling apparatus according to claim 1, further comprising a timing signal generating device for generating a timing signal indicating a timing when the reflection light signal becomes equal to or larger than the set threshold level, said controlling device changing the condition of the focus servo loop from the open condition to the close condition after the timing signal is generated by said timing signal generating device.

5. A focus servo controlling apparatus according to claim 1, wherein said controlling device sets the threshold level on the basis of the disturbance light intensity which is received by said light receiving element.

6. A focus servo controlling apparatus according to claim 1, wherein said controlling device sets the threshold level on the basis of a kind of information record medium.

7. A focus servo controlling apparatus according to claim 1, wherein the disturbance light is detected, when an objective lens in an optical pickup is driven to be far away from the information record medium and the influence of the reflection light from the information record medium is sufficiently eliminated.

8. A focus servo controlling apparatus according to claim 1, further comprising a timing signal generating device for generating a timing signal indicating a zero cross timing of a focus error signal after the level of a focus OK signal becomes valid, said controlling device changing the condition of the focus servo loop from the open condition to the close condition after the timing signal is generated by said timing signal generating device.

9. A focus servo controlling apparatus according to claim 1, wherein after the focus servo loop becomes close condition, said controlling device adjusts a gain of the servo loop and sets the threshold level again.

10. An information reproducing apparatus comprising:

(i) a focus servo controlling apparatus for performing a focus servo control by changing a condition of a focus servo loop from an open condition to a close condition in correspondence with a level of a reflection light signal, which is obtained as a reflection light of a light beam reflected from an information record medium is detected by a light receiving element, said apparatus comprising:

a disturbance level detecting device for detecting a level of a disturbance light signal, which is obtained as a disturbance light other than the reflection light is received by said light receiving element; and a controlling device for setting a level, which is larger than the level of the disturbance light signal detected by said disturbance level detecting device, as a threshold level and for changing the condition of the focus servo loop from the open condition to the close condition on the basis of a timing when the level of the reflection light signal becomes equal to or larger than the set threshold level, (ii) a light emitting device for emitting the light beam onto said information record medium while performing a focus servo control by the focus servo loop in the close condition, and (iii) a reproducing device for reproducing information recorded on said information record medium on the basis of the reflection light signal.

11. An information reproducing apparatus according to claim 10, wherein said controlling device sets as the threshold level a level obtained by adding an addition level, which is set in advance on the basis of a minimum level of the reflection light signal detected in advance, onto the level of the disturbance light signal detected by said disturbance level detecting device.

12. An information reproducing apparatus according to claim 10, wherein said focus servo controlling apparatus further comprises a minimum level detecting device for detecting a minimum level of the reflection light signal, and said controlling device sets the threshold level to be less than the detected minimum level.

13. An information reproducing apparatus according to claim 10, wherein said focus servo controlling apparatus further comprises a timing signal generating device for generating a timing signal indicating a timing when the reflection light signal becomes equal to or larger than the set threshold level, and said controlling device changes the condition of the focus servo loop from the open condition to the close condition after the timing signal is generated by said timing signal generating device.

14. An information recording apparatus comprising:

(i) a focus servo controlling apparatus for performing a focus servo control by changing a condition of a focus servo loop from an open condition to a close condition in correspondence with a level of a reflection light signal, which is obtained as a reflection light of a light beam reflected from an information record medium of recordable type is detected by a light receiving element, said apparatus comprising:

a disturbance level detecting device for detecting a level of a disturbance light signal, which is obtained as a disturbance light other than the reflection light is received by said light receiving element; and a controlling device for setting a level, which is larger than the level of the disturbance light signal detected by said disturbance level detecting device, as a threshold level and for changing the condition of the focus servo loop from the open condition to the close condition on the basis of a timing when the level of the reflection light signal becomes equal to or larger than the set threshold level, and (ii) a recording device for emitting the light beam, which corresponds to record information to be recorded, onto said information record medium while performing a focus servo control by the focus servo loop in the close condition, to thereby record the record information onto said information record medium.

15. An information recording apparatus according to claim 14, wherein said controlling device sets as the threshold level a level obtained by adding an addition level, which is set in advance on the basis of a minimum level of the reflection light signal detected in advance, onto the level of the disturbance light signal detected by said disturbance level detecting device.

16. An information recording apparatus according to claim 14, wherein said focus servo controlling apparatus further comprises a minimum level detecting device for detecting a minimum level of the reflection light signal, and said controlling device sets the threshold level to be less than the detected minimum level.

17. An information recording apparatus according to claim 14, wherein said focus servo controlling apparatus further comprises a timing signal generating device for generating a timing signal indicating a timing when the reflection light signal becomes equal to or larger than the set threshold level, and said controlling device changes the condition of the focus servo loop from the open condition to the close condition after the timing signal is generated by said timing signal generating device.

18. A focus servo controlling apparatus for performing a focus servo control by changing a condition of a focus servo loop from an open condition to a close condition in correspondence with a level of a reflection light signal, which is obtained as a reflection light of a light beam reflected from an information record medium is detected by a light receiving element, said apparatus comprising:

a disturbance level detecting device for detecting a level of a disturbance light signal, which is obtained as a disturbance light that is not reflected from the information record medium and is received by said light receiving element; and a controlling device for setting a level, which is larger than the level of the disturbance light signal detected by said disturbance level detecting device, as a threshold level and for changing the condition of the focus servo loop from the open condition to the close condition on the basis of a timing when the level of the reflection light, which is reflected from the information record medium, signal becomes equal to or larger than the set threshold level.

19. A focus servo controlling apparatus according to claim 18, wherein said controlling device sets the threshold level on the basis of the disturbance light intensity which is received by said light receiving element.

20. A focus servo controlling apparatus according to claim 18, wherein said controlling device sets the threshold level on the basis of a kind of information record medium.

21. A focus servo controlling apparatus according to claim 18, wherein the disturbance light is detected, when an objective lens in an optical pickup is driven to be far away from the information record medium and the influence of the reflection light from the information record medium is sufficiently eliminated.

22. A focus servo controlling apparatus according to claim 18, further comprising a timing signal generating device for generating a timing signal indicating a zero cross timing of a focus error signal after the level of a focus OK signal becomes valid, said controlling device changing the condition of the focus servo loop from the open condition to the close condition after the timing signal is generated by said timing signal generating device.

23. A focus servo controlling apparatus according to claim 18, wherein after the focus servo loop becomes close condition, said controlling device adjusts a gain of the servo loop and sets the threshold level again.

* * * * *